United States Patent [19]
Marconi

[11] Patent Number: 5,941,588
[45] Date of Patent: Aug. 24, 1999

[54] TAILGATE EXTEND-A-BED KIT

[76] Inventor: Michael D. Marconi, 1647 Domain Loop, Rio Rancho, N.Mex. 87124

[21] Appl. No.: 09/079,614

[22] Filed: May 15, 1998

[51] Int. Cl.[6] .................................................. B62D 33/02
[52] U.S. Cl. ......................................................... 296/26.11
[58] Field of Search ........................................ 296/26.11

[56] References Cited

U.S. PATENT DOCUMENTS

| | | | |
|---|---|---|---|
| 4,813,842 | 3/1989 | Morton | 414/557 |
| 4,889,378 | 12/1989 | Sims | 296/57.1 |
| 5,328,225 | 7/1994 | Melching et al. | 296/26 |
| 5,449,212 | 9/1995 | Seifert | 296/57.1 |
| 5,533,771 | 7/1996 | Taylor et al. | 296/26 |
| 5,669,654 | 9/1997 | Fillers et al. | 296/26 |
| 5,788,311 | 8/1998 | Tibbals | 296/26.11 |
| 5,806,907 | 9/1998 | Martinus et al. | 296/26.11 |

*Primary Examiner*—Gary C. Hoge
*Attorney, Agent, or Firm*—Joseph N. Breaux

[57] ABSTRACT

A tailgate extend-a-bed kit which provides three vertically upright planar members which enclose the free edges of the tailgate to extend the cargo bed of a pick-up truck when the tailgate is horizontal. One of the planar members has a height substantially the height of the tailgate and a width substantially the width of the tailgate. Moreover, the one planar member is slidably coupled in vertically upright channel guide members. Thereby, the one planar member can be slidably removed to open the extended cargo bed. The two other planar members having the same relative height as the tailgate are pivotally coupled to a respective vertically upright channel guide member such that a respective one of the two other planar members is pivotally aligned with a respective side edge of the tailgate and perpendicular to the one planar member. The pivotal coupling of the two other planar members allows the two other planar members to pivot to a position substantially parallel to the one planar member.

12 Claims, 3 Drawing Sheets

TAILGATE EXTEND-A-BED KIT

TECHNICAL FIELD

The present invention relates to accessories for attachment to tailgates and, more particularly, to a tailgate extend-a-bed kit which provides three vertically upright planar members which enclose the free edges of the tailgate to extend the cargo bed of a pick-up truck when the tailgate is horizontal. One of the planar members has a height substantially the height of the tailgate and a width substantially the width of the tailgate. Moreover, the one planar member is slidably coupled in vertically upright channel members. Thereby, the one planar member can be slidably removed to open the extended cargo bed. The two other planar members having the same relative height as the tailgate are pivotally coupled to a respective vertically upright channel member such that a respective one of the two other planar members is pivotally aligned with a respective side edge of the tailgate and perpendicular to the one planar member. The pivotal couplings of the two other planar members allow the two other planar members to also pivot to a position substantially parallel to the one planar member.

BACKGROUND OF THE INVENTION

Pickup trucks are available in various makes and models. Most manufactures provide models which extend the cab of the pickup truck or which extend the cargo bed. As can be appreciated, pickup trucks which have the extended cargo bed are more costly to purchase. Therefore, some truck purchasers opt to purchase the cheaper model pickup truck and forego the oftentimes needed extra cargo bed length which would be provided by with the extended cargo bed model.

Regardless of the length of the cargo bed, truck owners oftentimes transport cargo in the cargo bed but would prefer to have a little more length in the cargo bed to accommodate the cargo. My tailgate extend-a-bed kit is an accessory for tailgates and has been designed to allow truck owners to extend the cargo bed of their pickup trucks in an inexpensive manner.

Several accessories have been patented which are aimed attachments for tailgates.

U.S. Pat. No. 5,669,654, by Eilers et al., entitled "EXTENDABLE REAR GATE FOR VEHICLE CARGO BED" discloses a selectively extendable tailgate section for the cargo bed of a pick-up truck including a telescoping tailgate section having side walls and a bottom which are telescopically received within the fixed sides and bottom of the cargo bed. Rails support the expanded bed and are supported by a plurality of roller for easy movement of the tailgate section. The telescoping tailgate section carries the flip-down gate and the tail lights of the vehicle keeping these features in tact regardless of the expanded position of the tailgate section.

U.S. Pat. No. 5,533,771, to Taylor et al., entitled "MULTIPLE PURPOSE TRUCK TAILGATE APPARATUS" discloses a multiple purposes truck apparatus for pick-up trucks which comprises a first panel member and a structure for mounting the first panel member in a sliding manner to the bed of the truck. When the tailgate is opened, the first panel member can be extended therefrom. Further provided are a second panel member and a third panel member wherein the second panel member is coupled to a free end of the first panel member and the third panel member is coupled to a free end of the second panel member. In operation, the apparatus can serve as a loading ramp, a display/work table, an incline ramp, a ladder.

U.S. Pat. No. 5,449,212, to Seifert, entitled "ELECTRICALLY-CONTROLLED TAILGATE OPERATOR" discloses a tailgate operator which lowers and raises the tailgate of a truck.

U.S. Pat. No. 5,328,225, to Melching et al., entitled "SYSTEM MOUNTABLE TO A TAILGATE OF A PICK-UP TRUCK TO IMPROVE THE UTILITY THEREOF" discloses a set of four light-weight planar plates successively hinged to one another with an end plate of the set of connected plates hinged to the inside surface of the tailgate.

U.S. Pat. No. 4,889,378, to Sims, entitled "PICKUP TRUCK TAILGATE ACCESSORY" discloses an accessory for attachment to the tailgate of a pickup comprising a panel member of about the same width as the tailgate, and of a height at least about half that of the tailgate. The panel member is hingely coupled to the free end of the tailgate. The hinge coupling of the panel member allows the panel member to pivot between a first position parallel to the tailgate and a second position substantially perpendicular to the tailgate. The accessory serves as an extended stop for long lengths of cargo or as a protector for the top of the tailgate.

U.S. Pat. No. 4,813,842, to Morton, entitled "TAIL GATE APPARATUS FOR PICK-UP TRUCKS" discloses a tailgate apparatus comprising a frame assembly adapted to be mounted around the preexisting bumper of a vehicle after removal of the conventional tail gate. The assembly provides for lifting and raising of the tail gate from a lowered position. The assembly allows the tail gate to be extended away from the rear end of the pick-up truck and lowered.

While each of the above accessory attachments for tailgates function as desired, none of them have a tailgate extend-a-bed kit which provides three vertically upright planar members which enclose the free edges of the tailgate to extend the cargo bed of a pick-up truck when the tailgate is horizontal; wherein one of the planar members has a height substantially the height of the tailgate and a width substantially the width of the tailgate; wherein the one planar member is slidably coupled in vertically upright channel members thereby the one planar member can be slidably removed to open the extended cargo bed; wherein the two other planar members having the same relative height as the tailgate are pivotally coupled to a respective vertically upright channel member such that a respective one of the two other planar members is pivotally aligned with a respective side edge of the tailgate and perpendicular to the one planar member; and wherein the pivotal couplings of the two other planar members allow the two other planar members to also pivot to a position substantially parallel to the one planar member.

As will be seen more fully below, the present invention is substantially different in structure, methodology and approach from that of the prior attachments for tailgates.

SUMMARY OF THE INVENTION

The preferred embodiment of the tailgate extend-a-bed kit of the present invention solves the aforementioned problems in a straight forward and simple manner. What is provided is a tailgate extend-a-bed kit which provides three vertically upright planar members which enclose the free edges of the tailgate to extend the cargo bed of a pick-up truck when the tailgate is horizontal. One of the planar-members has a height substantially the height of the tailgate and a width substantially the width of the tailgate. Moreover, the one planar member is slidably coupled in vertically upright channel guide members. Thereby, the one planar member can be slidably removed to open the extended cargo bed. The two other planar members having the same relative height as the tailgate are pivotally coupled to a respective vertically upright channel guide member such that a respective one of the two other planar members is pivotally aligned with a respective side edge of the tailgate and perpendicular to the one planar member. The pivotal couplings of the two other planar members allow the two other planar members to also pivot to a position substantially parallel to the one planar member.

The tailgate extend-a-bed kit for extending a cargo bed of a pickup truck having a tailgate wherein said tailgate has a width and a length and wherein said width of said tailgate is longer than said length of said tailgate and said length of said tailgate is equivalent to a height of said tailgate when said tailgate is in a vertical position comprises: a first planar member having first and second ends and a length substantially equivalent to said width of said tailgate; a second side planar member having a length substantially equivalent to said length of said tailgate and having a first position parallel to said first planar member and a second position perpendicular to said first planar member; a third side planar member having a length substantially equivalent to said length of said tailgate and having a first position parallel to said first planar member and a second position perpendicular to said first planar member; a first support member having pivotally coupled thereto said second side planar member for pivoting said second side planar member between said first position and said second position and supporting said second side planar member vertically upright and having coupled thereto said first end of said first planar member; a second support member having pivotally coupled thereto said third side planar member for pivoting said third side planar member between said first position and said second position and for supporting said third side planar member vertically upright and having coupled thereto said second end of said first planar member wherein said first support member and said second support member are parallelly spaced a distance substantially equivalent to said width of said tailgate and support said first planar member vertically upright.

The tailgate extend-a-bed kit further includes a floor member adapted to be coupled parallel to an interior surface of said tailgate wherein said first and second support members (channel guide members) are pivotally coupled to rear corners of said floor member to pivot from a parallel position to a perpendicular position wherein said first and second support members are maintained in said perpendicular position when said second side planar member and said third side planar member are in their respective second position.

In view of the above, an object of the present invention is to provide a tailgate extend-a-bed kit which extends the cargo bed of a pick-up truck or the like by enclosing the free edges of the tailgate (when in the horizontal open position) with vertically upright planar members.

Another object of the present invention is to provide a tailgate extend-a-bed kit with three planar member which are vertically upright when the tailgate is in the opened position and an additional planar member parallel to the tailgate which serves as a floor.

A further object of the present invention is to provide a tailgate extend-a-bed kit which allows the tailgate to be closed while the extend-a-bed kit is coupled thereto.

It is a still further object of the present invention to provide the tailgate extend-a-bed kit with vertically upright channel guide members which are hingely coupled to rotate from a vertical position to a horizontal position to collapse the tailgate extend-a-bed kit. In general, when the two other planar members are pivoted to a position essentially parallel with the one planar member, and the vertically upright channel guide members are pivoted rearwardly and become essentially parallel with the tailgate, tailgate extend-a-bed kit is in a collapsed position.

It is a still further object of the present invention to provide a tailgate extend-a-bed kit which includes a spring biased locking arms which matingly engages notches positioned along the top portion of the sides of the vertically upright planar member disposed on the rear edge of the tailgate.

It is a still further object of the present invention to provide a tailgate extend-a-bed kit which includes a securing means for securing the spring biased locking arm in any one of a plurality of notches so that the one planar member can be raised and secured one of a plurality of incremental distances above the tailgate.

It is a still further object of the present invention to provide a tailgate extend-a-bed kit which includes two vertically upright side planar members wherein each vertically upright side planar member is pivotally coupled to a respective vertical upright channel guide member to pivot to a position essentially aligned with a respective side edge of the tailgate, and wherein each vertically upright side planar member is provided with a securing means to maintain the its position aligned with the corresponding respective side edge of the tailgate.

In view of the above objects, it is a feature of the present invention to provide a tailgate extend-a-bed kit which is simple to manufacture.

Another feature of the present invention is to provide a tailgate extend-a-bed kit which is relatively simple structurally.

A further feature of the present invention is to provide a tailgate extend-a-bed kit which is easy to install and detach.

It is a still further features of the present invention to provide a tailgate extend-a-bed kit which is durable.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
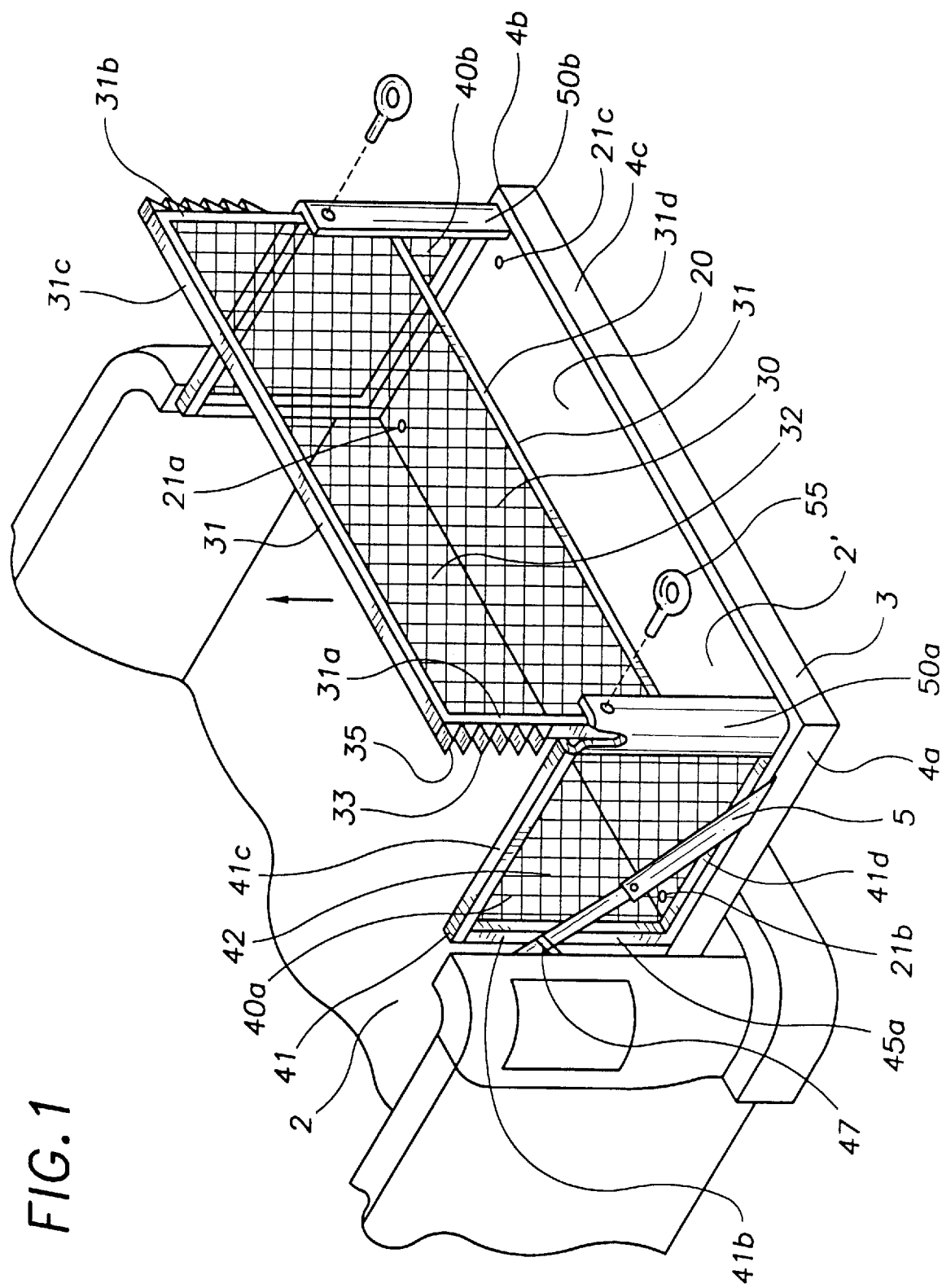
FIG. 1 illustrates a rear view of the preferred embodiment of the tailgate extend-a-bed kit of the present invention in use.
Figure 2:
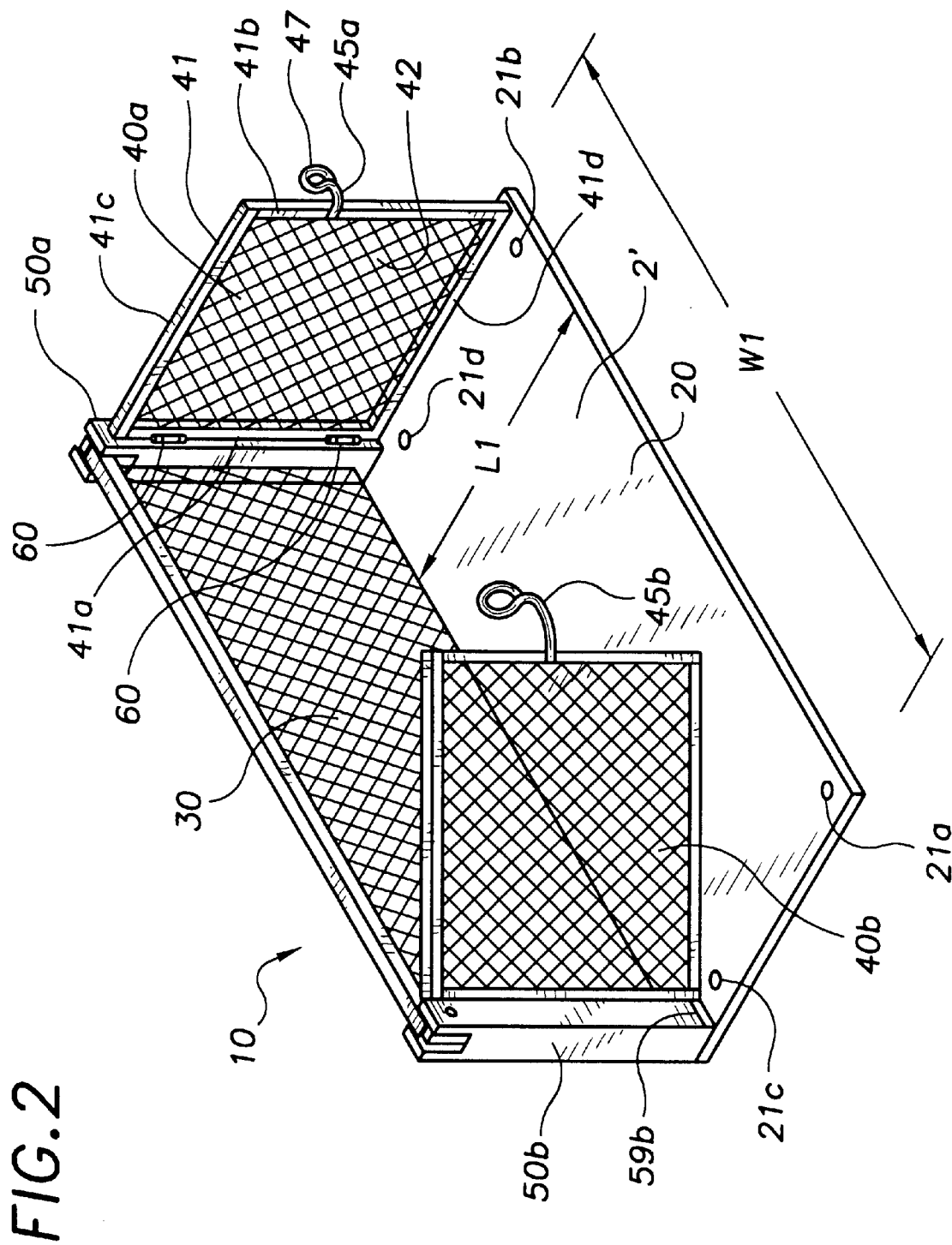
FIG. 2 illustrates a front perspective view of the preferred embodiment of the tailgate extend-a-bed kit of FIG. 1.

Referring now to the drawings, and in particular FIGS. 1–4, the tailgate extend-a-bed kit of the present invention is designated generally by the numeral 10. Tailgate extend-a-bed kit 10 is comprised of first planar member 20, first and second channel guide members 50a and 50b, second planar member 30, third planar member 40a and fourth planar member 40b.

Pick-up trucks often include a hingely coupled tailgate 3 which is adapted to be rotated to and from a horizontal position and a vertical position. The tailgate, when closed, is essentially aligned vertically to close the rear distal end of cargo bed 2 of the pick-up truck. When the tailgate is opened and rotated to an essentially horizontal position, cargo bed 2, of the pick-up truck in open. The tailgate, when in the horizontal position, is flush with the floor of cargo bed 2.

Tailgate extend-a-bed kit 10 of the present invention serves to extend the length of cargo bed 2 substantially the length of tailgate 3 when tailgate 3 is in the horizontal position wherein the length of tailgate 3 corresponds to the height of tailgate 3 when tailgate 3 is closed. Tailgate extend-a-bed kit 10 is removably coupled to tailgate 3 and can be easily removed and installed, as desired.

As can be readily seen, tailgate extend-a-bed kit 10 forms cargo bed extension enclosure 2' which extends beyond the outer limits of the enclosure defined by cargo bed 2 without compromising the operation of taillights 1 or tailgate 3. The description and operation of tailgate extend-a-bed 10 will be described primarily in relation to tailgate 3 in its horizontal position.

First planar member 20 is dimensioned to be coupled parallelly to the interior planar surface of tailgate 3. First planar member 20 has a length L1 substantially the same length (height) of tailgate 3 and a width W1 substantially the same width of tailgate 3 such that first planar member 20 extends between tailgate hinge members 5 (only one shown) directly coupled to tailgate 3 for rotating tailgate 3 to and from the horizontal position and the vertical position. As can be appreciated, the dimensions of first planar member 20 should not in any way compromise the opening and closing of tailgate 3. Therefore, for different pickup truck models, the dimensions of tailgate 3 may differ. Thereby, the dimensions of first planar member 20, first and second channel guide members 50a and 50b, second planar member 30, third planar member 40a and fourth planar member 40b should vary accordingly.

In the preferred embodiment, first planar member 20 has formed therein four apertures, each of which is formed in close proximity to a respective corner of first planar member 20. First planar member 20 is detachably secured to tailgate 3 via a plurality of bolts 21a, 21b, 21c, and 21d wherein a respective one of the bolts 21a, 21b, 21c, and 21d is received in a respective one of the apertures. Nevertheless, first planar member may be secured to tailgate 3 via other conventional securing means which allows first planar member 20 to be detachably coupled to tailgate 3. Alternatively, first planar member 20 may be permanently affixed to tailgate 3, if desired. As can be appreciated, first planar member 20 serves as a floor.

First and second channel guide members 50a and 50b are coupled to the first and second rear corners, respectively, of first planar member 20 wherein first and second channel guide members 50a and 50b are coupled perpendicular to first planar member 20. When tailgate 3 is in the horizontal position, first and second channel guide members 50a and 50b are vertically upright. In general, first and second channel guide members 50a and 50b provide the primary support for maintaining the second, third and fourth planar members 30, 40a and 40b vertically upright when tailgate 3 is in the horizontal position.

In the preferred embodiment, first and second channel guide members 50a and 50b are hingely coupled via hinge means 59a and 59b, respectively, to first planar member 20 to rotate from a vertically upright position perpendicular to first planar member 20, when tailgate 3 is horizontal, to a horizontal position parallel to first planar member 20 to collapse tailgate extend-a-bed kit 10. The hinge coupling of first and second channel guide members 50a and 50b via respective hinge means (only 59b shown) allows first and second channel guide members 50a and 50b to pivot rearwardly along the sides of tailgate 3 until first and second channel guide member are essentially parallel to first planar member 20.

Figure 3:
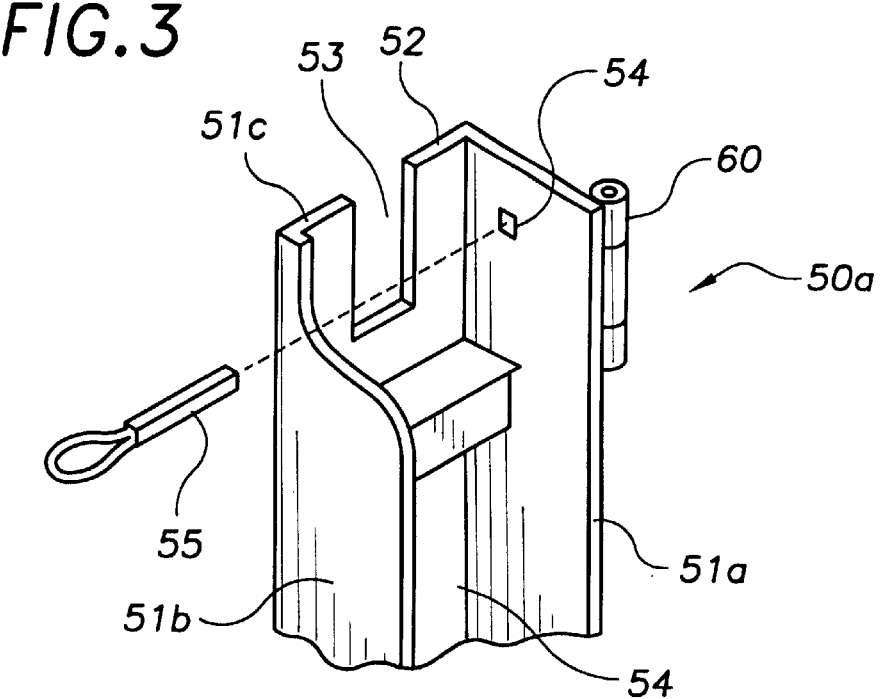
FIG. 3 illustrates a top partial view of the channel guide member of the present invention; and, FIG. 4 illustrates a view of the mating connection between the spring biased locking arm and the teeth of the second planar member.
Figure 4:
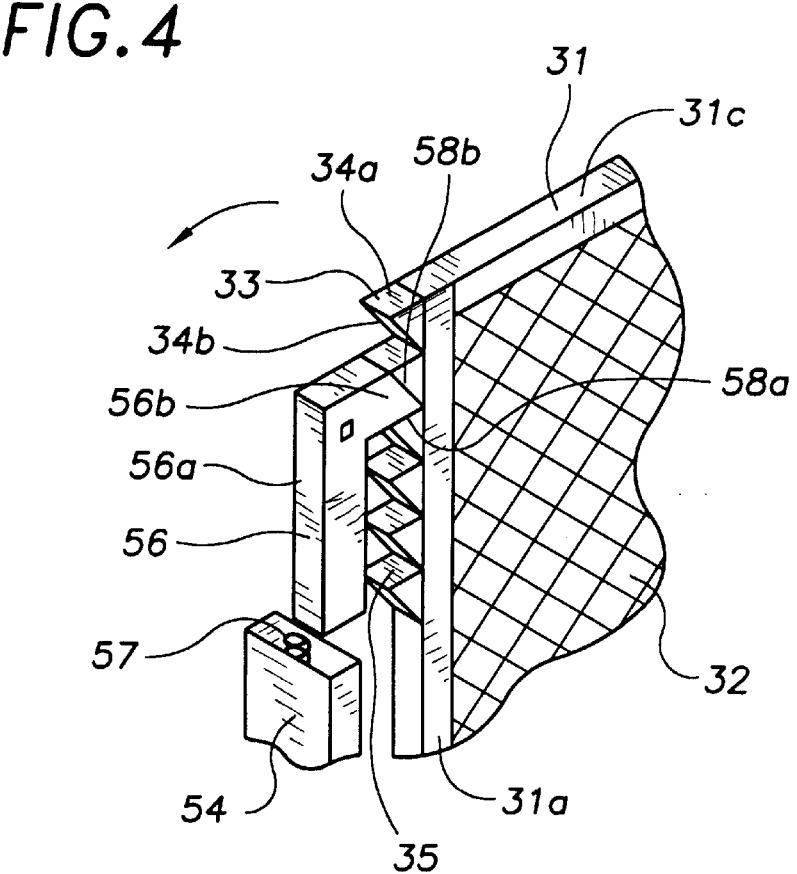

Since first and second channel guide members 50a and 50b are identical, only one such channel guide member will be described in detail. Referring now to FIGS. 3 and 4, first channel guide member 50a is generally U-shaped defined by first and second parallel sides 51a and 51b which are maintained in spaced relation via connecting cross surface 51c. First channel guide member 50a comprises recess 53, apertures 54, stop member 54, securing means 55, spring biased locking arm 56 and hinge means 60.

Spring biased locking arm 56 is spring biased via resilient spring member 57. Spring biased locking arm 56 is defined by rectangularly shaped member 56a and locking protrusion 56b coupled to the top portion of rectangularly shaped member 56a. Locking protrusion 56b is generally right triangularly shaped defined by lower horizontal surface 58a and top angled surface 58b which slopes to the free end of lower horizontal surface 58a. Lower horizontal surface 58a is perpendicularly coupled to rectangularly shaped member 56a.

The top edge 52 of connecting cross surface 51c has formed therein recess 53 which extends downward a predetermined distance. Recess 53 is dimensioned to allow spring biased locking arm 56, as best seen in FIG. 4, to be pulled therethrough. In general, spring biased locking arm 56 is positioned in the interior of first channel guide member 50a and aligned with recess 53. Below recess 53 and spring biased locking arm 56, connecting cross surface 51c has coupled thereto stop member 54 wherein resilient spring member 57 is coupled to and between a bottom surface of spring biased locking arm 56 and a top surface of stop member 54.

First and second parallel sides 51a and 51b have formed therein aligned apertures 54 for receiving therein securing means 55. Securing means 55, in the preferred embodiment, is a locking pin, preferably, having a square shaped shaft wherein the square shaped shaft prevents spring biased locking arm 56 from rotating from its locking position.

Second planar member 30 has a height, preferably, which is substantially equivalent to the same height as tailgate 3 when tailgate 3 is in the vertical position which is essentially equivalent to length L1 of first planar member 20. Second planar member 30 comprises a rectangularly-shaped frame 31 having fixedly attached in the interior thereof planar surface 32. In the preferred embodiment, planar surface 32 is mesh-like or cage-like. Nevertheless, planar surface 32 may be solid. It should be further noted, that if desired, second planar member 30, third and fourth planar members 40a and 40b and first and second channel guide members 50a and 50b may be painted with the same color as the color as the pickup truck so that tailgate extend-a-bed kit 10 when installed does not distract from the visual appearance of the pickup truck.

Rectangularly-shaped frame 31 has two parallel short side frame members 31a and 31b and parallel top and bottom long frame members 31c and 31d. Each of short side frame members 31a and 31b has coupled thereto along the top portion thereof a plurality of securing teeth 33 in spaced relation to define a plurality of notches 35. Each tooth of the plurality of securing teeth 33 has a top horizontal surface 34a and a bottom angled surface 34b which angles from the free end to top horizontal surface to short side frame members 31a. Any two adjacent teeth create a uniquely contoured notch 35 which allows spring biased locking arm 56 to be received therein.

The mating engagement between spring biased locking arm 56 and any two adjacent teeth allows second planar member 30 to be lowered in channel member 50a wherein, as second planar member 30 is lowered in first and second channel guide members 50a and 50b, locking protrusion 56b of spring biased locking arm 56 slides in and out of a respective notch and into another notch of the plurality of notches 35 until second planar member 30 is completely lowered in first and second channel guide members 50a and 50b.

Securing means 55 (a locking pin) can be used to secure spring biased locking arm 56 in any one of the plurality of notches 35. Thereby, second planar member 30 may be secured in first and second channel guide members 50a and 50b such that second planar member 30 is positioned a distance above first planar member 20. Therefore, second planar member 30 can be raised or lowered and secured in one of the plurality of notches 35. Thereby, second planar member 30 is capable of being maintained in one of a plurality of incremental distances above tailgate 3.

When spring biased locking arm 56 is in its locking position, locking protrusion 56b matingly engages one of the plurality notches 35 defined by any two adjacent teeth of the plurality of securing teeth 33. When the locking pin is journalled through aligned apertures 54 and spring biased locking arm 56, the locking pin secures spring biased locking arm 56 in its locking position. On the other hand, when locking pin 55 is removed, spring biased locking arm 56 is adapted to be cocked in the direction of ARROW 1 to allow spring biased locking arm 56 to be retracted from the mating engagement with a respective one of the plurality of notches 35 so that second planar member 20 can be raised upward in the direction of ARROW 2. However, when second planar member 20 is being lowered, spring biased locking arm 56 need not be cocked since the spring biased locking arm 56 is capable of sliding in and out of the plurality of notches 35.

In an alternate embodiment, first and second channel guide members 50a and 50b may be replaced with vertical support members without channels and would have hingely coupled thereto second planar member 30. Thereby, second planar member 30 would be opened and closed in a manner similar to tailgate 3. In other words, second planar member 30 would be pivoted to and from a horizontal position and a vertical position.

Since third and fourth planar members 40a and 40b are identical only one such planar member will be described in detail. Third planar member 40a has a height, preferably, with is substantially equivalent to the same length as tailgate 3 or length L1 of first planar member 20. Third planar member is hingely coupled to first channel member 50a via hinge means 60 which allows third planar 40a to pivot to and from a position essentially perpendicular to second planar member 30 and a position essentially parallel to second planar member 30.

Third planar member 40a comprises an essentially square-shaped frame 41 having fixedly attached in the interior thereof planar surface 42. In the preferred embodiment, planar surface 42 is mesh-like or cage-like. Nevertheless, planar surface 42 may be solid. Square-shaped frame 41 has two parallel side frame members 41a and 41b and parallel top and bottom frame members 41c and 41d. Side frame member 41a is hingely coupled to first channel guide member 50a along side 51a of first channel guide member 50a via hinge means 60.

When third planar member 40a is pivoted such that third planar member 40a is perpendicular to second planar member 30, third planar member 40a is disposed along the side edge 4a of tailgate 3. Likewise, when fourth planar member 40a is pivoted such that fourth planar member 40b is perpendicular to second planar member 30, fourth planar member 40b is disposed along the side edge 4b of tailgate 3. Second planar member 30 is disposed along rear edge 4c of tailgate 3. As can be readily seen, second planar member 30, third planar member 40a and fourth planar member 40 extends and encloses cargo bed 2 to create cargo bed extension enclosure 2' defined by tailgate extend-a-bed kit 10.

Preferably, there is a means capable of preventing third and fourth planar members 40a and 40b from swinging (rotating) to maintain either their perpendicular alignment or their parallel alignment with second planar member 30. There are numerous ways to secure third and fourth planar members 40a and 40b to prevent the pivotal rotation (swinging) of thereof such as, without limitation, with the use of latches, locking pins, and strapping means.

For exemplary purposes, third planar member 40a may be secured in the position perpendicular to second planar member 30 and parallel to second planar member 30 via strapping means 45a coupled in the center of side frame member 41b wherein the free end of strapping means 45a has locking hook member 47. Likewise, fourth planar member 40b is secured via strapping means 45b.

Locking hook member 47 includes a hook shaped member and resilient locking arm. In operation, to secure third planar member 40a in the position perpendicular to second planar member 30, the hook shaped member of locking hook member 47 is hooked onto hinge member 5 of tailgate 3 and locked thereto via the resilient locking arm. On the other hand, when securing third planar member 40a in the parallel position, locking hook member 47 would be removed from hinge member 5. Thereafter, third planar members 40a would be rotated in the direction toward second planar member 30. Locking hook member 47 could then be locked onto the mesh-like planar surface 31 of second planar member 30. As can be appreciated, the third and fourth planar members 40a and 40b would be secured in an essentially parallel position with second planar member 30.

As can be appreciated, when third and fourth planar members 40a and 40b, are parallel to second planar member 30, first and second channel guide members 50a and 50b are capable of rotating from the position perpendicular to tailgate 3 to a position parallel to tailgate 3 to collapse tailgate extend-a-bed kit 10. In operation, when transitioning tailgate extend-a-bed kit 10 from the collapsed position to an open position to form cargo bed extension enclosure 2', first and second channel guide members 50a and 50b are rotated from the position parallel to tailgate 3 to the position perpendicular to tailgate 3. Thereafter, as third and fourth planar members 40a and 40b are pivoted from the position parallel to second planar member 30 to the position perpendicular to second planar member 30, first and second channel guide members 50a and 50b are maintained in the position perpendicular to tailgate 3. Henceforth, first and second channel guide members 50a and 50b are not capable of being pivoted to the position parallel to tailgate 3 unless, third and fourth planar members 40a and 40b are rotated from their perpendicular position to their parallel position with second planar member 30.

It is noted that the embodiment of the tailgate extend-a-bed kit described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tailgate extend-a-bed kit for extending a cargo bed of a pickup truck having a tailgate, wherein said tailgate has a width and a length, and wherein said width of said tailgate is longer than said length of said tailgate and said length of said tailgate is equivalent to a height of said tailgate when said tailgate is in a vertical position, comprising:

a first planar member having first and second ends and a length substantially equivalent to said width of said tailgate;

a second side planar member having a length substantially equivalent to said length of said tailgate and having a first position parallel to said first planar member and a second position perpendicular to said first planar member;

a third side planar member having a length substantially equivalent to said length of said tailgate and having a first position parallel to said first planar member and a second position perpendicular to said first planar member;

a first support member having pivotally coupled thereto said second side planar member for pivoting said second side planar member between said first position and said second position and supporting said second side planar member vertically upright and having coupled thereto said first end of said first planar member; and, a second support member having pivotally coupled thereto said third side planar member for pivoting said third side planar member between said first position and said second position and for supporting said third side planar member vertically upright and having coupled thereto said second end of said first planar member wherein said first support member and said second support member are parallelly spaced a distance substantially equivalent to said width of said tailgate and support said first planar member vertically upright;

said first planar member comprising:

a rectangularly-shaped frame removably coupled slidably in said first and second support members and having two parallel short side frame members and parallel top and bottom long frame members wherein said two parallel short sides have a length substantially equivalent to said length of said tailgate and parallel top and bottom long frame members have a length substantially equivalent to said width of said tailgate; and, a planar surface secured in an interior of said rectangularly-shaped frame.

2. The tailgate extend-a-bed kit of claim 1, wherein said first planar member further comprises:

a first set of a plurality of teeth couple in tandem long a top portion of a first one of said two parallel short side frame members wherein a bottom surface of each tooth of said first set of said plurality of teeth is horizontal and a top surface of said each tooth is sloped to a free end of said bottom surface of said each tooth;

a first set of a plurality of notches wherein each notch of said first set of said plurality of notches is defined by a space between any two adjacent teeth of said first set of said plurality of teeth;

a second set of a plurality of teeth couple in tandem along a top portion of a second one of said two parallel short side frame members wherein a bottom surface of each tooth of said second set of said plurality of teeth is horizontal and a top surface of said each tooth is sloped to a free end of said bottom surface of said each tooth; and, a second set of a plurality of notches wherein each notch of said second set of said plurality of notches is defined by a space between any two adjacent teeth of said second set of said plurality of teeth.

3. The tailgate extend-a-bed kit of claim 2, wherein each of said first and second support members comprises:

first and second parallel sides;

connecting cross surface perpendicularly coupled to said first and second parallel sides to define a U-shaped channel;

a recess formed in a top edge of said connecting cross surface and extends downward a predetermined distance; and, a spring biased locking arm spring biased in said U-shaped channel and aligned with said recess wherein said spring biased locking arm of said first support member slides in and out of said first set of said plurality of notches and said spring biased locking arm of said second support member slides in and out of said second set of said plurality of notches.

4. The tailgate extend-a-bed kit of claim 3, wherein each of said first and second support members further comprises:

a securing means for securing said spring biased locking arm in a locking position.

5. The tailgate extend-a-bed kit of claim 1, wherein said planar surface is a mesh planar surface.

6. The tailgate extend-a-bed kit of claim 4, wherein said planar surface is a mesh planar surface.

7. The tailgate extend-a-bed kit of claim 6, further comprising:

a first means for maintaining said second side planar member in said second position; and, a second means for maintaining said third side planar member in said second position.

8. A tailgate extend-a-bed kit for extending a cargo bed of a pickup truck having a tailgate, wherein said tailgate has a width and a length, and wherein said width of said tailgate is longer than said length of said tailgate and said length of said tailgate is equivalent to a height of said tailgate when said tailgate is in a vertical position, comprising:

a first planar member having first and second ends and a length substantially equivalent to said width of said tailgate;

a second side planar member having a length substantially equivalent to said length of said tailgate and having a first position parallel to said first planar member and a second position perpendicular to said first planar member;

a third side planar member having a length substantially equivalent to said length of said tailgate and having a first position parallel to said first planar member and a second position perpendicular to said first planar member;

a first support member having pivotally coupled thereto said second side planar member for pivoting said second side planar member between said first position and said second position and supporting said second side planar member vertically upright and having coupled thereto said first end of said first planar member;

a second support member having pivotally coupled thereto said third side planar member for pivoting said third side planar member between said first position and said second position and for supporting said third side planar member vertically upright and having coupled thereto said second end of said first planar member wherein said first support member and said second support member are parallelly spaced a distance substantially equivalent to said width of said tailgate and support said first planar member vertically upright; and, a floor member adapted to be coupled parallel to an interior surface of said tailgate wherein said first and second support members are pivotally coupled to rear corners of said floor member to pivot from a parallel position to a perpendicular position and wherein said first and second support members are maintained in said perpendicular position when said second side planar member and said third side planar member are in their respective second position;

said first planar member comprising:

a rectangularly-shaped frame removably coupled slidably to said first and second support members and having two parallel short side frame members and parallel top and bottom long frame members wherein said two parallel short sides have a length substantially equivalent to said length of said tailgate and parallel top and bottom long frame members have a length substantially equivalent to said width of said tailgate; and, a planar surface secured in an interior of said rectangularly-shaped frame.

9. The tailgate extend-a-bed kit of claim 8, wherein said first planar member further comprises:

a first set of a plurality of teeth couple in tandem along a top portion of a first one of said two parallel short side frame members wherein a bottom surface of each tooth of said first set of said plurality of teeth is horizontal and a top surface of said each tooth is sloped to a free end of said bottom surface of said each tooth;

a first set of a plurality of notches wherein each notch of said first set of said plurality of notches is defined by a space between any two adjacent teeth of said first set of said plurality of teeth;

a second set of a plurality of teeth couple in tandem along a top portion of a second one of said two parallel short side frame members wherein a bottom surface of each tooth of said second set of said plurality of teeth is horizontal and a top surface of said each tooth is sloped to a free end of said bottom surface of said each tooth; and, a second set of a plurality of notches wherein each notch of said second set of said plurality of notches is defined by a space between any two adjacent teeth of said second set of said plurality of teeth.

10. The tailgate extend-a-bed kit of claim 9, wherein each of said first and second support members comprises:

first and second parallel sides;

connecting cross surface perpendicularly coupled to said first and second parallel sides to define a U-shaped channel;

a recess formed in a top edge of said connecting cross surface and extends downward a predetermined distance; and, a spring biased locking arm spring biased in said U-shaped channel and aligned with said recess wherein said spring biased locking arm of said first support member slides in and out of said first set of said plurality of notches and said spring biased locking arm of said second support member slides in and out of said second set of said plurality of notches.

11. The tailgate extend-a-bed kit of claim 10, wherein each of said first and second support members further comprises:

a securing means for securing said spring biased locking arm in a locking position.

12. The tailgate extend-a-bed kit of claim 8, wherein said planar surface is a mesh planar surface.

* * * * *